US008468265B2

(12) United States Patent
Mohler

(10) Patent No.: US 8,468,265 B2
(45) Date of Patent: Jun. 18, 2013

(54) TASK-ORIENTED COMMUNICATION FILTER METHOD AND APPARATUS

(75) Inventor: David S. Mohler, Arvada, CO (US)

(73) Assignee: Avaya Inc., Basking Ridge, NJ (US)

( * ) Notice: Subject to any disclaimer, the term of this patent is extended or adjusted under 35 U.S.C. 154(b) by 270 days.

(21) Appl. No.: 12/753,653

(22) Filed: Apr. 2, 2010

(65) Prior Publication Data

US 2011/0246668 A1   Oct. 6, 2011

(51) Int. Cl.
*G06F 15/173* (2006.01)
(52) U.S. Cl.
USPC ........... 709/238; 709/242; 709/243; 709/217; 709/218; 709/224
(58) Field of Classification Search
USPC ................. 709/238, 217, 218, 224, 242, 243
See application file for complete search history.

(56) References Cited

U.S. PATENT DOCUMENTS

| | | | |
|---|---|---|---|
| 5,434,908 A | 7/1995 | Klein | |
| 6,591,304 B1 | 7/2003 | Sitaraman et al. | |
| 2004/0044736 A1* | 3/2004 | Austin-Lane et al. | 709/206 |
| 2005/0032528 A1* | 2/2005 | Dowling et al. | 455/456.1 |
| 2005/0270157 A1* | 12/2005 | Mohammed et al. | 340/572.1 |
| 2007/0016573 A1 | 1/2007 | Nanavati et al. | |
| 2007/0047700 A1 | 3/2007 | Mohler | |
| 2008/0108373 A1* | 5/2008 | Agarwal et al. | 455/456.6 |
| 2008/0177726 A1* | 7/2008 | Forbes et al. | 707/5 |
| 2008/0281510 A1 | 11/2008 | Shahine | |
| 2009/0157617 A1 | 6/2009 | Herlocker et al. | |
| 2009/0157653 A1 | 6/2009 | Herlocker et al. | |
| 2009/0265429 A1* | 10/2009 | Gestsson et al. | 709/204 |
| 2011/0047246 A1* | 2/2011 | Frissora et al. | 709/219 |

OTHER PUBLICATIONS

Fabini et al., "Terminal-Centric Location Services for the IP Multimedia Subsystem," Vehicular Technology Conference, 2006. VTC 2006-Spring. IEEE 63rd, vol. 2, no., pp. 881-885, May 7-10, 2006.*
Pannu, S. Anandeep, et al., "A Learning Personal Agent for Text Filtering and Notification" The Robotics Institute School of Computer Science, Carnegie Mellon University, Pittsburgh, PA 15213.

* cited by examiner

*Primary Examiner* — Wing F Chan
*Assistant Examiner* — Kostas Katsikis
(74) *Attorney, Agent, or Firm* — Sheridan Ross P.C.

(57) ABSTRACT

A variety of mechanisms are used to determine a user's task orientation. Rich presence detection could be used to identify whether a person is at home, at work, traveling, or the like. Temporal factors can also be considered to determine a user's probable persona such as working, personal time, traveling (business or personal), and the like. Entries in a user's calendar application and/or to-do-list reminders can be searched to add information about a user's task orientation and up-coming deliverables. Activity monitors on phones, computers, and the like, can be used to determine files be accessed, applications being used, out-bound communications being sent, in-bound communications, up-coming meetings, and the like, to further refine the nature of a user's tasks. A program evaluates all of these information sources to determine a user's focus and presents topically relevant communications and filters the rest to keep the user from being interrupted.

20 Claims, 2 Drawing Sheets

TASK-ORIENTED COMMUNICATION FILTER METHOD AND APPARATUS

FIELD

An exemplary embodiment is directed toward communication management. More specifically, an exemplary embodiment is directed toward task-oriented techniques that perform communication filtering and management.

BACKGROUND

For years it has been the goal of communications and information transfer to be able to communicate, collaborate, obtain and exchange information with parties that we are associated with. Because of the dynamic increase of information sources via the internet, and because of the simultaneous increase in modes of communication, many of them being real time, many now find themselves overloaded by information and communications. Added to that problem, the fact that each individual must also act in several capacities or persona such as personal, professional, etc., there is a problem of what information and communications to focus on and when.

Corporations have been concerned about the productivity losses due to spam, spit, spyware, viruses, and other worthless and/or damaging communications. They have innovated many different products, that when coupled with corporate policies, try to filter many of these malware or threats out. Studies have been conducted about the use of Instant Messaging (IM), Twitter®, and other social media sites such as Facebook®. There are indications that much of this communication content provides no real benefit to a user's work or personal endeavors. As a result, this becomes another threat to personal and professional effectiveness and productivity.

SUMMARY

What is needed is a method of not just filtering out malware, and categorizing communications into trusted/rejected groups, but the ability to prioritize and present information and communications according to what task(s) the user is or should be currently focused on. This task orientation can be applied to inbound communications and information such that it is brought to a user's attention based on the task that the user is focusing on for some period of time. For example, if an employee is working on a time critical project, and must get a certain amount done by due date/time, many communications can simply be a deleterious interruption to that focus.

Determination of task focus can be achieved via a combination of the use of information from a scheduler, specific files, applications, and the like, being worked on by the user, via outbound communication subject matter, and the like. In general, any information including presence information, rich presence information, current tasks, currently opened document(s), and the like, can be included in the assessment as to whether the user should receive a specific communication.

For example, and in accordance with one exemplary embodiment, a system is provided that takes input about a user's focus and applies appropriate filters to inbound communications and information based on the user's focus. This could at least partially eliminate interruptions of time critical work by irrelevant or less important communications.

In accordance with one exemplary embodiment, systems, methods, and techniques are disclosed herein that use a variety of mechanisms to determine a user's task orientation. Rich presence detection could be used to identify whether a person is at home, at work, traveling, or the like. Temporal factors can be considered such as the day of the week and time of day to determine a user's probable persona such as working, personal time, traveling (business or personal), and the like. Entries in a user's calendar application and/or to-do-list reminders can be searched to add information about a user's task orientation and up-coming deliverables. Activity monitors on wired or wireless phones, computers, and the like, can be used to determine files be accessed, applications being used, out-bound communications being sent, in-bound communications, up-coming meetings, and the like, to further refine the nature of a user's tasks. A software program could hierarchically evaluate all of these information sources to determine a user's key tasks for a specific period of time. The program could distill this information and present it in a pop-up window or comparable interface, for the user to concur, reject, modify and/or supplement. Once this is accomplished, a filter designed to present topically relevant communications (e-mail, fax, IM, phone, video, multimedia, etc.) and information from various sources such as internet sources, RSS feeds, and the like, can be applied to keep the user from being interrupted.

The generation of the filter parameters can be based on people collaborating on a project as determined from out-bound communications, social networks and specified topics in degrees of separation, document authors, and the like. Further, the generation of filter parameters can be from project names, key words, entries and project management tools, rules, exceptions, and the like. In cooperation with the above, information from one or more of calendars, documents, project management applications, and the like can also be considered. The results of the filtering can be approved, modified, supplemented and/or rejected by the user via an interface, such as a pop-window that queries the user as to whether a determined filtering action is appropriate. This filter generation could again be via a program that can detect and utilize the type of information described herein which can also work in cooperation with the methods that determine task orientation.

Another component of the system could be an exception engine. This would allow certain key people, certain topics, such as emergencies or to-do-list items for an upcoming time period, or the like to be passed through the filter. The exception processing could be automatic and/or with a user query via, for example, an interface such as a pop-up window, or the like.

Another component could be a user interface that would allow a user to turn on and turn off the task oriented communication system, allowing reviews/modifications/approval/rejection/supplementation of the tasks, filters, or exception engine parameters. This user interface could also allow the user to decide what to do with the communication and content that is filtered. Options would include later presentation when the user is less task focused, selectively deletion of certain communications, allowing communications agent bots to respond, and the like.

Yet another component of the system could be a machine learning program that detects behavioral patterns of the user when the task filter is on or off to improve the task definition and/or filtration parameters. These types of machine learning techniques and bots, which could be automated, semi-automated, or the like, enable the system to learn based on an observed behavior to, for example, improve performance.

Accordingly, an exemplary embodiment of this invention is directed toward utilizing one or more of activity and presence detection, combined with calendar/to-do-lists, user input, and devices being used to determine a user's tasks, and using such tasks as an in-bound communications filter to keep the user productive by eliminated off-topic, non-urgent communication presentation.

Aspects of the invention are thus directed toward communications management.

Additional aspects are directed toward filtering in-bound communications based on a determined task.

Additional aspects of the invention relate to filtering in-bound communications based on one or more of presence information and rich presence information.

Even further aspects of the invention relate to comparing one or more of Internet information, voicemail, tweets, blogs, IMs, and in general any received information to one or more tasks a user is currently working on, and filtering out the information that is not related to one of those tasks.

Additional aspects of the invention relate to analyzing one or more of schedule information, calendar information, to-do information, task information, project information, focus information, and currently in-use files, devices, and/or applications, to determine one or more tasks a user is currently involved with.

Additional aspects of the invention relate to utilizing rules and/or policies, which may optionally include one or more exceptions, to further govern handling of in-bound information.

Even further aspects of the invention relate to providing an interface that allows a user to provide feedback as to whether the appropriate handling of the information was selected.

Even further aspects of the invention relate to providing a user interface that allows a user to override a determination made by an information management system as to whether information should be forwarded to that user.

Even further aspects of the invention relate an information management system that is capable of learning based on one or more of user feedback, user habits, and the like.

Even further aspects of the invention relate to providing a user with the filtered out information when the user has finished working on one or more specific tasks.

Additional aspects of the invention relate to the use of an automatic response module to assist with responding to in-bound information while the user is engaged with one or more tasks.

Even further aspects of the invention relate to modifying an interfaces behavior, such as a computer, telephone, of the like, when it is determined that the in-bound information is not related to one or more tasks currently being performed by the user. For example, various pop-ups, sounds, and the like could be suppressed unless the in-bound information is directly related to the one or more tasks the user is currently engaged with.

Additional aspects are directed toward retrieving filtered information upon the completion of one or more tasks, and providing that information from, for example, one or more information stores to the user on one or more devices such as a PC, phone, cell phone/PDA/smart phone, or the like.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic even if performance of the process or operation uses human input, whether material or immaterial, received before performance of the process or operation. Human input is deemed to be material if such input influences how the process or operation will be performed. Human input that consents to the performance of the process or operation is not deemed to be "material".

The term "computer-readable medium" as used herein refers to any tangible storage and/or transmission medium that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, RAM, PROM, EPROM, FLASH-EPROM, solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the invention is considered to include a tangible storage medium or distribution medium and prior art-recognized equivalents and successor media, in which the software implementations of the present invention are stored.

The terms "determine," "calculate" and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the invention is described in terms of exemplary embodiments, it should be appreciated that individual aspects of the invention can be separately claimed.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below.

BRIEF DESCRIPTION OF THE DRAWINGS

The exemplary embodiments of the invention will be described in detail, with the reference to the following figures, wherein.

DETAILED DESCRIPTION

The invention will be illustrated below in conjunction with an exemplary communication system. Although well suited for use with, e.g., a system using a server(s) and/or data base(s), the invention is not limited to use with any particular type of communication system or configuration of system elements. Those skilled in the art will recognize that the disclosed techniques may be used in any communication application in which it is desirable to maintain the security of portable electronic devices and the like.

The exemplary systems and methods of this invention will also be described in relation to software, modules, and associated hardware. However, to avoid unnecessarily obscuring the present invention, the following description omits well-known structures, components and devices that may be shown in block diagram form, are well known, or are otherwise summarized.

For purposes of explanation, numerous details are set forth in order to provide a thorough understanding of the present invention. It should be appreciated, however, that the present invention may be practiced in a variety of ways beyond the specific details set forth herein.

Figure 1:
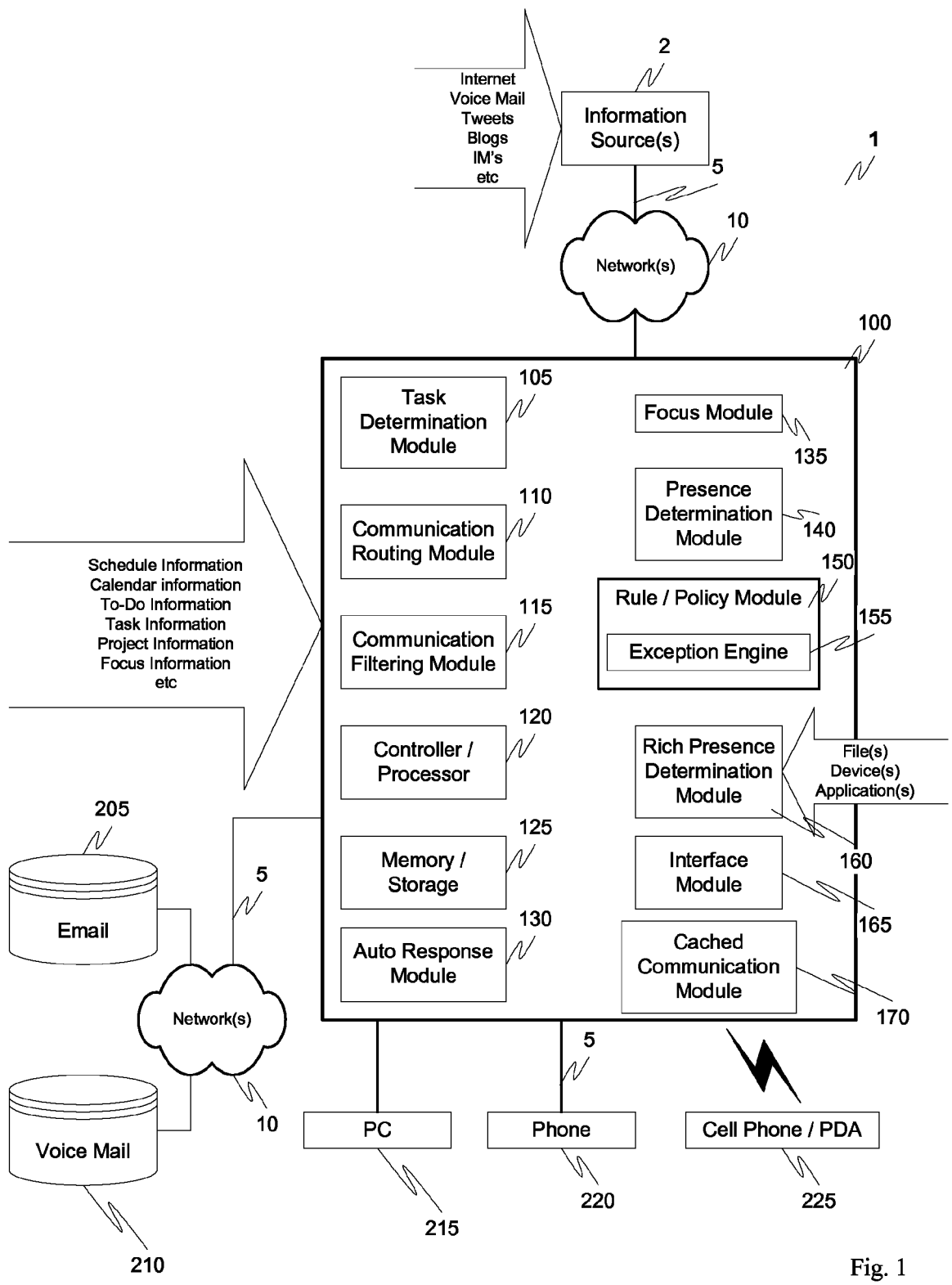
FIG. 1 illustrates an exemplary communications environment.

FIG. 1 illustrates an exemplary communications environment 1. The communications environment 1 includes one or more information sources 2 connected, via links 5 and networks 10, through the information management system 100. The information management system can be connected via links 5 and network(s) 10, to e-mail storage 205 and voice-mail storage 210. Additionally, the information management system 100 can be associated with one or more of a PC 215, phone 220, and cell phones/PDA 225.

The information management system 100 comprises a task determination module 105, a communication routing module 110, a communication filtering module 115, a controller/processor 120, memory/storage 125, auto response module 130, focus module 135, presence determination module 140, rule/policy module 150, an exception engine 155, a rich presence determination module 160, interface module 165, and cached communication module 170.

In accordance with a first exemplary operational embodiment, the techniques disclosed herein can be manually invoked by a user. In accordance with a second exemplary embodiment, the techniques can be automatically invoked based on one or more factors. For example, an application can monitor one or more activities being performed by a user, and upon one or more of these activities commencing, automatically start the techniques disclosed herein thereby providing greater focus. In addition, a user can associate a flag with certain activities, documents, processes, applications, or the like, and when the application senses the presences of this flag, automatically start or stop the techniques disclosed herein. For example, the techniques disclosed herein can be envisioned as associated with one or more of a PC, phone, cell phone, PDA, or the like, and upon a application detecting that the user has initiated a conference call amongst a plurality of parties, the techniques disclosed herein can be implemented thereby allowing the user to focus on the conference call. As another example, the application can dynamically analyze the content of, for example, a document, e-mail, or the like, thereby determining the context and, based on a comparison of this context to one or more rules, policies, and/or exceptions, the systems and techniques disclosed herein can be turned on or off as appropriate.

In addition, and in accordance with an optional exemplary embodiment, a pop-up or comparable user interface can be displayed during various stages of the operation of the techniques disclosed herein asking the user for confirmation as to whether the selected action is correct. The user's response to these pop-ups can be used as feedback to the rule/policy module 150 such that the information management system 100 can "learn" and become more accurate.

The information management system 100 receives information from one or more information sources 2 such as from the internet, voice mails, tweets, blogs, IMs, phone calls, RSS feeds, and in general any information in any communications modality from any one or more sources. Upon receipt of this information, and in cooperation with the presence determination module 140, presence information about the user is determined. As an example, this presence information can be based on interrogation of one or more of schedule information, calendar information, to-do information, task information, project information, focus information, application information, currently open documents and context. As discussed, the determination of presence information can also be dynamic, such that open processes, documents, telephone calls in progress, and the like, can further be analyzed to assist with determining a user's current focus. As an example, words in a document can be analyzed to assist with determining context, caller ID information can be used and correlated to one or more individuals to assist with determining who a user is currently speaking with, and in general any information accessible by the information management system from one or more of the PC 215, phone 220, cell phone/PDA 225, and/or information derived from one or more Internet resources (not shown) can be utilized in assembling information regarding the user's presence.

One or more tasks the user is currently engaged in are determined by the task determination module 105. For example, if a user is drafting an e-mail, this can be determined by the task determination module 105, and in cooperation with the presence determination module 140 the draft e-mail analyzed to determined, for example, the subject of the e-mail with reference to the "Re:" line, the recipient(s) of the e-mail with the analysis of the "To:" line, and the like. Task determination module 105 abilities need not be limited to specific actions being performed currently by the user, but can also be extended to look at tasks the user may have initiated and have running in, for example, the background. As an example, a user could have invoked one or more of a reach-me application, a find-me application, a hide-me application, or the like, and this information can also be considered by the tasks determination module 105 to assist in determining the one or more tasks currently being performed or running.

To further assist in determining a user's current focus, the rich presence determination module 160 can optionally analyze rich presence information, such as which one or more files the user has opened or has recently accessed, which one or more devices the user is currently or has recently used, and which one or more applications are running or were recently running.

All of the above information can then be then analyzed by the focus module 135 to determine one or more focuses of the user. As discussed, these focuses can be correlated to a particular activity(s) the user is currently engaged with that will be used by the communication filtering module 115 and communication routing module 110 to assist the user in focusing on that particular focused-on task(s). As an example, the focus module 135 can analyze one or more of tasks, information, presence information, and rich presence information to gain a full appreciation of the user's current focus. This focus could be, for example, a telephone conference, the drafting of an e-mail, the running of a particular software application, listening to voice mail, typing a document, or in general any task that can be performed by a user when working with an electronic device, such as personal computer, phone, PDA, piece of equipment, or the like.

Once a focus has been determined, and in cooperation with a communication filtering module 115 and a communication routing module 110, a determination is made with reference to the rule/policy module 150 regarding what should be done in relation to the information received from the information source(s) 2.

For example, the rule/policy module 150 can include a rule set that can be one or more of predefined and user developed, that establishes rules for handling inbound communications based on the focus(es) of the user. In addition, exception rules can be stored by the exception engine 155 that may override rules in the rule/policy module 150. As an example, a user may establish that all calls originating from their home are governed by the exception engine 155 thereby allowing the communications to be immediately sent to the user's phone 220. As another example, all e-mails from a user's boss are also handled by the exception engine 155 and allowed to pass directly to the user's e-mail client.

In general, the exception engine 155 can be populated with one or more rules that allow special handling that overrides the general rules and policies associated with the rule/policy module 150. As discussed, the user can also optionally be provided with a pop-up during a learning or training phase of the operation of the information management system 100 with the responses to this pop-up being dynamically feed back into one or more of the rule/policy module 150 and exception engine 155 to further refine the handling of inbound communications from the information sources 2.

Upon application of one or more rules/policies and/or exceptions, one or more of the communication routing module 110 and communication filtering module 115, in cooperation with controller 120 and memory 125, route the incoming communication or information to a specific destination. For example, if it is determined that the inbound communication is related to a task currently being focused on by the user, and the rules indicate the user would like to receive that communication, and there are no exceptions, the inbound communication is provided to the user. For example, if the inbound communication is an e-mail, the e-mail is provided in the user's inbox. If the inbound communication is a telephone call, the call is routed to the phone 220 and the ringer is activated.

Alternatively, if it is determined that the inbound communication or information is not directed to a task currently being focused on the by the user, the rule/policy module 150 can govern how this communication or information is to be handled. In accordance with one exemplary embodiment, and in cooperation with the communication routing module 110 and the communication filtering module 115, the communication is routed to, in the example of an inbound e-mail, to an e-mail repository or store 205. Instead of the e-mail being populated in the user's inbox, the e-mail is cached in the e-mail repository 205 and can be displayed at a later time as discussed hereinafter. In a similar manner, if the inbound communication/information is a telephone call, the communication filtering module 115 can intercept the inbound phone call thereby filtering the inbound phone call from distracting the user and in cooperation with the communication routing module 110 forward the phone call directly to the voice mail repository 210 (optionally blocking the ringer of the phone).

Similar to the e-mail embodiment described above, the presence of a voice mail, assuming one has been left, can optionally be hidden from the user's attention until one or more of the user changes focus, invokes a new task, or manually requests access to their voice mail.

The degree of visibility into filtered communications can also be governed by the rule/policy module 150 such that in a very aggressive mode, nothing is displayed regarding the inbound communication, such as caller ID, voice mail presence light, pop-up regarding an inbound e-mail, or the like. In this manner, no information except that which is related to the user's current focus and/or task is able to distract the user. In a less aggressive embodiment, varying degrees of visibility into the received information can be provided based on one or more rules and the rules/policies module 150 and rules associated with the exception engine 155. For example, a brief snapshot of the inbound communication can be provided to the user such that the first few sentences of an e-mail, the first five seconds of voice mail, or the like can be provided. In another even less aggressive embodiment, inbound communications/information can be provided to the user in the communication's native format, such as an e-mail inbox, however the display characteristics of that information could be altered. For example and in the case of an e-mail, instead of the e-mail appearing in its normal font and/or color, the e-mail could be provided in a light gray or different color/font thereby indicating that the e-mail is not related to the user's current task or focus and has been filtered.

In accordance with another exemplary optional embodiment, and in cooperation with the auto response module 130, a user can establish one or more automated responses that, when activated by one or more rules in the rule/policy module 150, provide a response to the inbound communication/information. This embodiment can operate in a similar manner to the out-of-office capabilities of many e-mail clients, however its invoking is based on one or more rules and/or exceptions. For example, if the inbound communication is an e-mail from a colleague that is working on a task with the user, however the task being referenced in the e-mail is not the task the user is currently focused on, the auto response module 130 could respond to the inbound e-mail with the indication that the user is currently working on "Task X" but will be back in touch with the colleague shortly. Additionally, the level of disclosure in the auto response could be based on the identity of the sender of the inbound communication and the level of trust that the receiving party has with that sender. In general, the auto response module 130 can be configured with any custom message as desired by the user to provide an automatic response to one or more inbound communications and/or information as appropriate.

As will be appreciated, during the operation of the techniques disclosed herein, certain communications/information will be filtered to some extent by the communication filtering module 115. In accordance with an optional exemplary embodiment, and cooperating with the interface module 165, these filtered communications can be retrieved by the cached communication module 170 and presented to the user at one or more of a predetermined time and/or at the request of the user. For example, if the user's focus on a particular task is completed, for exemplary by the detection of a closing of an application, document, or the like, the focus module 135 cooperating with the interface module 165 and cached communication module 170 can optionally pop-up a display, such as a user interface, that provides the user with one or more of the communications filtered by the communication filtering module 115. This user interface can assimilate the various types of communication/information into a common interface, such that, for example, e-mails, voice mails, and the like can be accessible, or alternatively open up the native interfaces for the various filtered communications, such as an e-mail client, voice mail client, and the like for access by the user. The user can then access these various types of communications/information and address them as needed. In addition, options can be provided next to each communication that allow, for example, a user to select whether that communication was appropriately filtered. This information can then be used as feedback to the rule/policy module 150 and exception engine 155 to further refine how future communications/information are handled.

Figure 2:
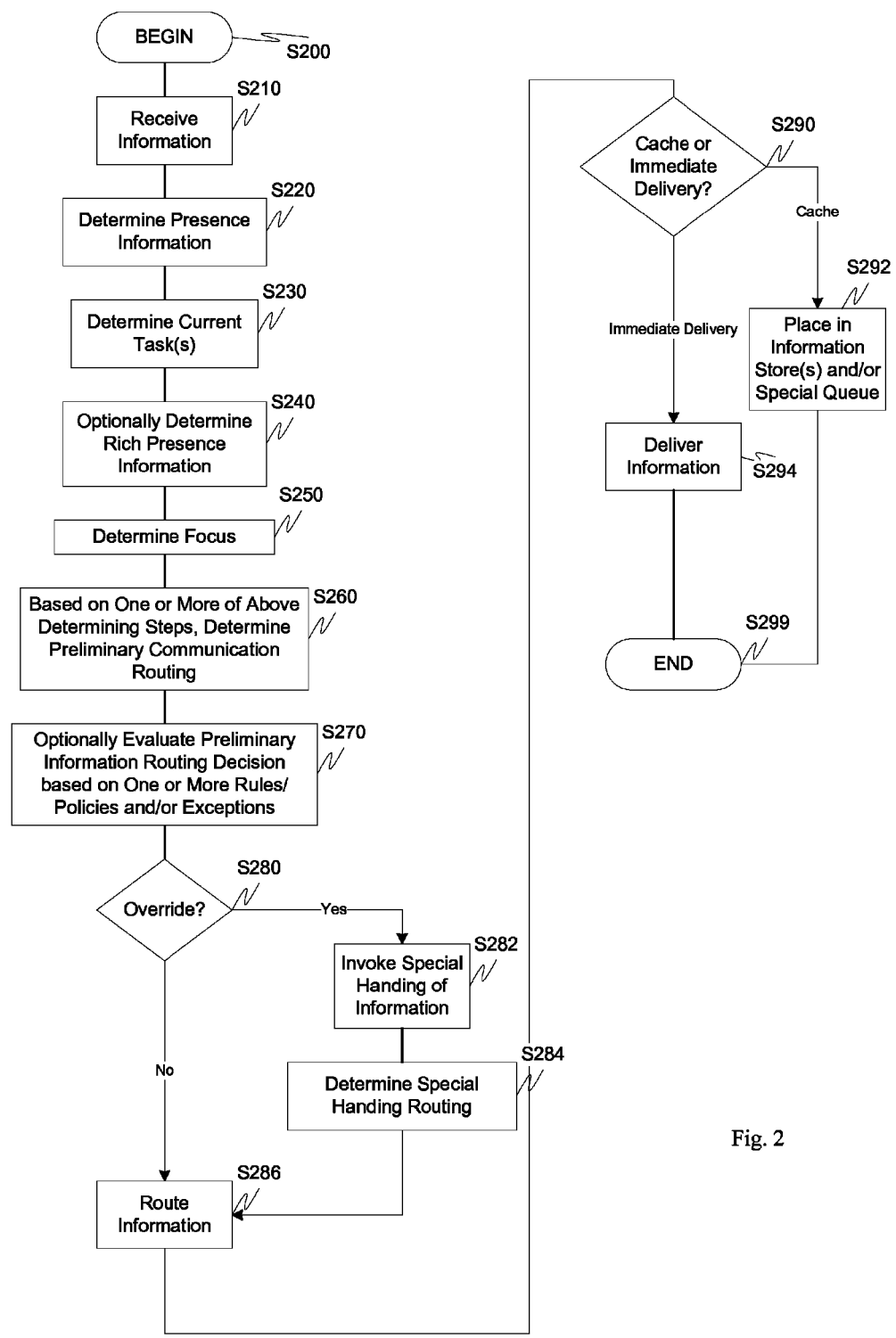
FIG. 2 is a flowchart outlining an exemplary method for communication or information management.

FIG. 2 outlines an exemplary method of operation of an information management system. In particular, control begins in step S200 and continues to step S210. In step S210, the information and/or communications are received from one or more information sources. As discussed, this information can be one or more of information from an Internet or distributed network resource, tweets, blogs, instant messages, RSS feeds, or in general any information received from any information source. In addition, the received information can be a communication, such as a voice mail, phone call, text message, or in general any communication in any communication modality. Next, in step S220, a user's presence is determined. As discussed, this presence can be based on one or more of an analysis of schedule information, calendar information, to-do information, task information, project information, focus information, and the like. Then, in step S230, one or more current tasks the user is currently working are determined. Control then continues to step S240.

In step S240, rich presence information can optionally be assessed with an analysis of one or more of open files, active devices, open applications, and the like. Varying degrees of granularity of rich presence information can also be determined, such as in the example where there are several applications open, which application is "on top" and the current focus of the user's attention. Next, in step S250, and based on one or more of the above types of information and analyses, a user's focus is determined. Then, in step S260, and based on one or more of the above determining steps, a preliminary determination as to the information/communication routing is determined. Optionally, in step S270 this preliminary information/communication routing decision can be compared to one or more rules, policies, and/or exceptions to further determine the appropriate handling for the inbound information/communication. Control then continues to step S280.

In step S280, a determination is made whether an override of the determined routing has been detected. As discussed, this override can be based on, for example, a rule associated with an exception engine and/or based on feedback received from a user. If an override is requested, control jumps to step S282 where special handling of the information/communication is invoked with, in step S284, the special handling/routing is determined. Control then continues to step S286.

In step S286, the information/communication is routed to a destination. For example, information/communication can be routed to a cached communication/information repository, routed directly to a user, or the like as discussed above. Control then continues to step S290.

In step S290, a determination is made whether the information/communication should be cached, or provided via an immediate mechanism to a user. If immediate delivery is needed, control continues to step S294 with control otherwise jumping to step S292.

In step S292, the information/communication is cached and placed in an appropriate information store and/or a special queue for a later presentation to a user. Control then continues to step S299 where the control sequence ends.

In step S294, and in the instance where the information/communication needs immediate delivery to the user, the information is delivered to the user in one or more of its native format or via an alternative modality as discussed above. Control then continues to step S299 where the control sequence ends.

Further, as discussed above, and optionally after the determination of the communication/information routing an automatic response can optionally be returned to the originator(s) of the inbound communication. For example, if it is determined that a call is being received from home, and the user is on a work-related conference call, an automatic response can be played to the caller stating that, for example, "I'm on a work conference call and will call back when done." As another example, based on the amalgamation of information that was used to determine a user's current task and/or focus, this information can be provided to the originator of an inbound communication. For example, if it is determined that an inbound e-mail is from a work colleague, and the e-mail is directed toward "Task X" but the user is currently working on "Task Y" an auto response could be returned to the work colleague saying that "I'm currently working on Task Y, and will give you a call when done."

As will be appreciated, the automatic response can be as general or specific as a user desires, and can further be dynamically generated as discussed above.

Furthermore, while the exemplary embodiments discussed above discuss information/communication handling in relation to an information management system and a related personal computer, phone, cell phone/PDA, it should be appreciated that the systems, techniques, and methods disclosed herein can be used with any one or more electronic devices and can further be extended to including presence information such as biological information, time and day information, travel information, local time and day information, and in general any information relating to the presence status of a user.

While the above-described flowchart has been discussed in relation to a particular sequence of events, it should be appreciated that changes to this sequence can occur without materially effecting the operation of the invention. Additionally, the exact sequence of events need not occur as set forth in the exemplary embodiments. The exemplary techniques illustrated herein are not limited to the specifically illustrated embodiments but can also be utilized with the other exemplary embodiments and each described feature is individually and separately claimable.

The systems, methods and protocols of this invention can be implemented on a special purpose computer in addition to or in place of the described communication equipment, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a communications device, such as a phone, any comparable means, or the like. In general, any device capable of implementing a state machine that is in turn capable of implementing the methodology illustrated herein can be used to implement the various communication methods, protocols and techniques according to this invention.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized. The security systems, methods and protocols illustrated herein can be readily implemented in hardware and/or software using any known or later developed systems or structures, devices and/or software by those of ordinary skill in the applicable art from the functional description provided herein and with a general basic knowledge of the computer and security arts.

Moreover, the disclosed methods may be readily implemented in software that can be stored on a storage medium, executed on a programmed general-purpose computer with the cooperation of a controller and memory, a special purpose computer, a microprocessor, or the like. In these instances, the systems and methods of this invention can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications device or system.

It is therefore apparent that there has been provided, in accordance with the present invention, systems, apparatuses and methods for enhancing focus. While this invention has been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this invention.

The invention claimed is:

1. A method to assist a user in maintaining focus comprising:
   receiving, at an information management system, one or more of inbound information and inbound communications from one or more information sources;
   determining a user's presence;
   determining one or more tasks currently being performed by the user;
   after receipt of the one or more of inbound information and inbound communications, determining a user's focus based on the one or more tasks currently being performed; and
   determining, by at least one CPU, a routing decision for the one or more of inbound information and inbound communications, wherein
   the routing decision is based on the determined focus and one or more of rules, policies, and exceptions, wherein
   the one or more of inbound information and inbound communications related to the user's determined focus are forwarded to the user, and wherein
   the one or more of inbound information and inbound communications not related to the user's determined focus are filtered unless subject to an exception.

2. The method of claim 1, wherein the inbound information and inbound communications are one or more of information from an Internet or distributed network resource, tweets, blogs, instant messages, RSS feeds, a voice mail, a phone call and a text message.

3. The method of claim 1, wherein the determination of the user's presence is based on one or more of an analysis of schedule information, calendar information, to-do information, task information, project information and focus information.

4. The method of claim 1, further comprising determining rich presence information associated with the user.

5. The method of claim 1, further comprising determining whether an override of the determined routing has been detected, wherein a special handling is invoked.

6. The method of claim 1, further comprising filtering the one or more of inbound information and inbound communications and routing the one or more of inbound information and inbound communications to a repository.

7. The method of claim 1, further comprising generating and returning an automatic response to an originator of an inbound communication, wherein the automatic response can be one or more of a predetermined response, an intelligent bot response, a combination of the automatic response and user entered information and a dynamically determined response.

8. The method of claim 1, further comprising modifying a native presentation mode of at least one of the received one or more of inbound information and inbound communications.

9. The method of claim 1, further comprising assembling filtered information for presentation to the user.

10. The method of claim 1, wherein one inbound communication is presented as a brief snapshot to the user.

11. A non-transitory computer-readable storage medium, having instructions stored thereon, that when executed by at least one CPU perform steps comprising:
    receiving, at an information management system, one or more of inbound information and inbound communications from one or more information sources;
    determining a user's presence;
    determining one or more tasks currently being performed by the user;
    after receipt of the one or more of inbound information and inbound communications, determining a user's focus based on the one or more tasks currently being performed; and
    determining, by at least one CPU, a routing decision for the one or more of inbound information and inbound communications, wherein
    the routing decision is based on the determined focus and one or more of rules, policies, and exceptions, wherein
    the one or more of inbound information and inbound communications related to the user's determined focus are forwarded to the user, and wherein
    the one or more of inbound information and inbound communications not related to the user's determined focus are filtered out unless subject to an exception.

12. A system that assists a user in maintaining focus comprising:
    an information management system including at least one CPU and memory that receives one or more of inbound information and inbound communications from one or more information sources;
    a presence determination module and CPU that determine a user's presence;
    a task determination module and CPU that determine one or more tasks currently being performed by the user;

a focus module and CPU that determine a user's focus, based on the one or more tasks and after receipt of the one or more of inbound information and inbound communications; and a communication filtering and routing module and CPU that determine a routing decision for the one or more of inbound information and inbound communications, wherein the routing decision is based on the determined focus and one or more of rules, policies and exceptions, wherein the one or more of inbound information and inbound communications related to the user's determined focus are forwarded to the user, and wherein the one or more of inbound information and inbound communications not related to the user's determined focus are filtered unless subject to an exception.

13. The system of claim 12, wherein the inbound information and inbound communications are one or more of information from an Internet or distributed network resource, tweets, blogs, instant messages, RSS feeds, a voice mail, a phone call and a text message.

14. The system of claim 12, wherein the determination of the user's presence is based on one or more of an analysis of schedule information, calendar information, to-do information, task information, project information and focus information.

15. The system of claim 12, further comprising a rich presence determination module that determines rich presence information associated with the user.

16. The system of claim 12, further comprising an exception engine that determines whether an override of the determined routing has been detected, wherein a special handling is invoked.

17. The system of claim 12, further comprising filtering the one or more of inbound information and inbound communications and routing the one or more of inbound information and inbound communications to a repository.

18. The system of claim 12, further comprising an auto response module that generates and returns an automatic response to an originator of an inbound communication, wherein the automatic response can be one or more of a predetermined response, an intelligent bot response, a combination of the automatic response and user entered information and a dynamically determined response.

19. The system of claim 12, further comprising a cached communication module that modifies a native presentation mode of at least one of the received one or more of inbound information and inbound communications.

20. The system of claim 12, wherein filtered information is assembled for presentation to the user.

* * * * *

UNITED STATES PATENT AND TRADEMARK OFFICE
CERTIFICATE OF CORRECTION

PATENT NO. : 8,468,265 B2  
APPLICATION NO. : 12/753653  
DATED : June 18, 2013  
INVENTOR(S) : David S. Mohler Page 1 of 1

It is certified that error appears in the above-identified patent and that said Letters Patent is hereby corrected as shown below:

On the Title Page

Item 57 in the Abstract:

Line 10, please delete "determine files be accessed" and insert --determine files being accessed-- therein.

Signed and Sealed this
Eighteenth Day of February, 2014

Michelle K. Lee
*Deputy Director of the United States Patent and Trademark Office*